US012802952B2

(12) United States Patent
Ivosev et al.

(10) Patent No.: US 12,802,952 B2

(45) Date of Patent: Nov. 17, 2026

(54) SYSTEMS AND METHODS FOR ERROR CORRECTION IN FAST SAMPLE READERS

(71) Applicant: DH Technologies Development Pte. Ltd., Singapore (SG)

(72) Inventors: Gordana Ivosev, Etobicoke (CA); Chang Liu, Richmond Hill (CA); David M. Cox, Toronto (CA)

(73) Assignee: DH Technologies Development Pte. Ltd., Singapore (SG)

( * ) Notice: Subject to any disclaimer, the term of this patent is extended or adjusted under 35 U.S.C. 154(b) by 136 days.

(21) Appl. No.: 18/725,973

(22) PCT Filed: Dec. 22, 2022

(86) PCT No.: PCT/IB2022/062708

§ 371 (c)(1),
(2) Date: Jul. 1, 2024

(87) PCT Pub. No.: WO2023/131850

PCT Pub. Date: Jul. 13, 2023

(65) Prior Publication Data

US 2025/0069873 A1 Feb. 27, 2025

Related U.S. Application Data

(60) Provisional application No. 63/297,423, filed on Jan. 7, 2022.

(51) Int. Cl.
*H01J 49/00* (2006.01)

(52) U.S. Cl.
CPC ................................ *H01J 49/0009* (2013.01)

(58) Field of Classification Search
CPC ........ H01J 49/0009; G01N 33/00; B01L 3/00; C12M 1/00
See application file for complete search history.

(56) References Cited

U.S. PATENT DOCUMENTS

| | | | |
|---|---|---|---|
| 5,995,989 A | 11/1999 | Gedcke et al. | |
| 6,369,382 B1 | 4/2002 | Ito et al. | |

(Continued)

FOREIGN PATENT DOCUMENTS

| | | | | |
|---|---|---|---|---|
| CN | 117881952 A | * | 4/2024 | |
| EP | 3377890 A1 | * | 11/2016 | ............ G01N 33/00 |

(Continued)

OTHER PUBLICATIONS

Anonymous, "Dataanalysis 4.0 reference manual", Oct. 1, 2009, pp. 1-404, retrieved from the internet on May 8, 2023 at: http://pubdata.theorchromo.ru/manuals/Bruker/DataAnalysis%20Reference%20Manual.pdf, attaching sections 6.1 and 6.3 and figures 6-5, 6-10, 6-13, 6-15, and 6-17 only (16 pages).

(Continued)

*Primary Examiner* — Uzma Alam
*Assistant Examiner* — Fani Polyzos Boosalis

(57) ABSTRACT

A method and system for detecting a signal measurement error, the method including providing a well plate including error correction wells and sample wells, each sample well including a single sample, and each error correction well including a mixture of samples from two or more sample wells. The method includes receiving an aliquot from the wells at a sample receiver, measuring a signal for the received aliquot, calculating an expected signal for each of the error correction wells, comparing the measured signal to the calculated expected signal for each error correction well, and determining whether an error exists in the signal of at least one sample well. When the error exists, the method correlates the error to one or more sample wells.

20 Claims, 10 Drawing Sheets

(56) References Cited

U.S. PATENT DOCUMENTS

| | | | | |
|---|---|---|---|---|
| 6,416,164 | B1 | 7/2002 | Stearns et al. | |
| 6,627,444 | B1 | 9/2003 | Goledzinowski | |
| 7,923,681 | B2 | 4/2011 | Collings et al. | |
| 8,378,293 | B1 | 2/2013 | Quimby | |
| 8,467,988 | B1 | 6/2013 | Roeder et al. | |
| 10,770,277 | B2 | 9/2020 | Datwani et al. | |
| 2007/0164205 | A1 | 7/2007 | Truche | |
| 2008/0237458 | A1* | 10/2008 | Wang | H01J 49/0009 250/282 |
| 2009/0194679 | A1 | 8/2009 | Doherty | |
| 2009/0212205 | A1 | 8/2009 | Thomson et al. | |
| 2012/0228489 | A1 | 9/2012 | Hohndorf | |
| 2013/0334416 | A1 | 12/2013 | Satake | |
| 2014/0283628 | A1* | 9/2014 | Hattingh | G01N 1/38 73/864.81 |
| 2014/0306106 | A1* | 10/2014 | Olney | H01J 49/0031 250/282 |
| 2018/0011990 | A1 | 1/2018 | Moseley et al. | |
| 2018/0182603 | A1 | 6/2018 | Schmidt | |
| 2018/0211213 | A1 | 7/2018 | Vivier | |
| 2019/0043703 | A1 | 2/2019 | Bern et al. | |
| 2019/0157060 | A1 | 5/2019 | Datwani et al. | |
| 2019/0250168 | A1 | 8/2019 | Valkenborg et al. | |
| 2019/0383840 | A1 | 12/2019 | Wiederin | |
| 2020/0021444 | A1 | 1/2020 | Young et al. | |
| 2020/0098552 | A1 | 3/2020 | Young et al. | |
| 2020/0363783 | A1 | 11/2020 | Tate | |
| 2021/0109069 | A1 | 4/2021 | Jones et al. | |
| 2021/0111013 | A1 | 4/2021 | Quarmby | |
| 2021/0168124 | A1 | 6/2021 | Suter | |
| 2021/0305035 | A1 | 9/2021 | Smith | |
| 2021/0305991 | A1 | 9/2021 | Smith | |
| 2021/0335589 | A1 | 10/2021 | Bern et al. | |
| 2021/0394171 | A1 | 12/2021 | Datwani et al. | |
| 2022/0139690 | A1 | 5/2022 | Covey et al. | |
| 2022/0359178 | A1 | 11/2022 | Le Blanc | |
| 2023/0343574 | A1 | 10/2023 | Chen et al. | |
| 2023/0410952 | A1* | 12/2023 | Tate | G16C 20/20 |
| 2024/0014020 | A1 | 1/2024 | Carlisle | |
| 2024/0258090 | A1 | 8/2024 | Le Blanc | |
| 2024/0339311 | A1 | 10/2024 | Covey | |
| 2024/0379336 | A1 | 11/2024 | Liu | |
| 2024/0412962 | A1 | 12/2024 | Duschoslav | |
| 2025/0149319 | A1 | 5/2025 | Burton | |
| 2025/0308871 | A1 | 10/2025 | Aw | |

FOREIGN PATENT DOCUMENTS

| | | |
|---|---|---|
| EP | 3460470 | 3/2019 |
| EP | 3460479 | 3/2019 |
| WO | 2017/153726 | 9/2017 |
| WO | 2019/229449 | 12/2019 |
| WO | 2020/203134 | 10/2020 |
| WO | 2022/157625 | 7/2022 |
| WO | 2023/131850 | 7/2023 |

OTHER PUBLICATIONS

Anonymous, "ICP-MS Inductively Coupled Plasma Mass Spectrometry, A Primer", Agilent Technologies, Dec. 31, 2005, 84 pgs.

Anonymous, "Voyager Biospectrometry Workstation—User Guide", Applied Biosystems, Jan. 1, 2000, retrieved from the internet on Jul. 11, 2016 at: http://www.niu.edu/analyticallab/_pdf/maldi/voyager-v51-userguide.pdf, 107 pages.

Anonymous, "Waters Quattro micro API Mass Spectrometer Operator's Guide 71500058602/Revision D", Jan. 1, 2010, pp. 1-256.

Duhrkop, Kai et al., "Searching molecular structure databases with tandem mass spectra using CSI:FingerID", PNAS, Oct. 13, 2015, vol. 112, No. 41, pp. 12580-12585.

Guan, Pengwei et al., "Full Collision Energy Ramp-MS2 Spectrum in Structural Analysis Relying on MS/MS", Analytical Chemistry 2021, 93, 15381-15389.

Hager et al., "Product ion scanning using a Q-q-Q linear ion trap (Q Trap) mass spectrometer", Rapid Communications in Mass Spectrometry (2003; 17:1056-1064.

Hasegawa, Koutaro et al., "The standard addition method and its validation in forensic toxicology", Forensic Toxicology, Tokyo, Springer, vol. 39, No. 2, Jun. 4, 2021, pp. 311-333.

Jaquet-Chiffelle, David et al., "Tamperproof timestamped provenance ledger using blockchain technology", Forensic Science International: Digital Investigations 33 (2020; 300977), 18 pgs.

Lermyte, Frederik et al., "Mind: A double-linear model to acurately determine monoisotopic precursor mass in high-resolution top-down proteomics", Analytical Chemistry, vol. 91, No. 15, Jul. 8, 2019, pp. 10310-10319.

Mortishire-Smith, Russel et al., Waters, White Paper, "Intelligent Data Capture: Real-Time Noise Reduction for High Resolution Mass Spectrometry", Jan. 1, 2016, pp. 1-6.

PCT International Preliminary Report on Patentability in International Application PCT/IB2022/062708, mailed Jul. 18, 2024, 10 pages.

PCT International Search Report and Written Opinion in International Application PCT/IB2022/062708, mailed Apr. 23, 2023, 17 pages.

Pohl, Kerstin et al., "Analysis of locked nucleic acid (LNA) oligoncleotides (ON) and related impurities using accurate mass spectrometry", Sciex, Dec. 11, 2020, 4 pgs.

Senko et al., "Determination of monoisotopic masses and ion populations for large biomolecules from resolved isotopic distributions", J. Am. Soc. Mass. Spectrum, 1995(6), 229-233.

Shrivastava, Aditya et al., "MassGenie: a transformer-based deep learning method for identifying small molecules from their mass spectra", Biomolecules 2021, 11, 1793, 23 pgs.

Stravs, Michael et al., "MSNovelist: de novo structure generation from mass spectra", Nature Methods, vol. 19, Jul. 2022, pp. 865-870.

Van Berkel, Gary et al., "Immediate frop on demand technology (I-DOT) coupled with mass spectrometry via an open port sampling interface", Bioanalysis, vol. 9, No. 21, Nov. 2, 2017, pp. 1667-1679.

Winkler, Robert, "ESIprot: a universal tool for charge state determination and molecular weight calculation of proteins from electrospray ionization mass spectrometry data: ESIprot: a universal tool for the analysis of protein ESI-MS data", Rapid Communications in Mass Spectrometry, vol. 24, No. 3, Feb. 15, 2010, pp. 285-294.

Zhang, Hui et al., "Acoustic Ejection Mass Spectrometry for High-Throughput Analysis", bioRxiv, Jan. 29, 2020, 32 pgs.

Zubarev, R.A., et al., "An A priori relationship between the average and monoisotopic masses of peptides and oligonucleotides", Rapid Communications in Mass Spectrometry, 1991(5), 276-277.

Zubarev, Roman et al., "Early life relict feature in peptide mass distribution", Central European Journal of Biology, 2019, vol. 5, pp. 190-196.

Benijts, Tom et al., "Analysis of Multiple Endocrine Disruptors in Environmental Waters via Wide-Spectrum Solid-Phase Extraction and Dual-Polarity Ionization LC-Ion Trap-MS/MS", Analytical Chemistry, Dec. 30, 2003, pp. 704-711; retrieved from the internet: https://pubs.acs.org/doi/10.1021/ac035062x?src=getftr.

Gardner, W. et al., "Understanding mass spectrometry images: complexity to clarity with machine learning", vol. 112, No. 4, Sep. 16, 2020, 17 pages.

Hever, H. et al., "Diversity matters: optimal collision energies for tandem mass spectrometric analysis of a large set of N-Glycopeptides", Journal of Proteome Research, vol. 21, No. 11, Oct. 6, 2022, pp. 2743-2753.

Jetybayeva, A. et al., "A review on recent machine learning applications for imaging mass spectrometry studies", Journal of Applied Physics, vol. 133, No. 2, Jan. 12, 2023, 37 pages.

Liu, Y. et al., "Current and future deep learning algorithms fortandem mass spectrometry (MS/MS)-based small molecule structure elucidation", Rapid Communications in Mass Spectrometry, no. Special Issue Perspective, e9120, May 26, 2021, 16 pages.

Neumann, S. et al., "Computational mass spectrometry for metabolites and small molecules", Analytical and Bioanalytical Chemistry, vol. 398, No. 7-8, Oct. 9, 2010, pp. 2779-2788.

(56) References Cited

OTHER PUBLICATIONS

Skinnider, M.A. et al., "A deep generative model enables automated structure elucidation of novel psychoactive substances", Nature Machine Intelligence, vol. 13, No. 11, Nov. 15, 2021, 24 pages.

Smets, T. et al., "Evaluation of distance metrics and spatial autocorrelation in uniform manifold approximation and projection applied to mass spectrometry imaging data", Analytical Chemistry, vol. 91, No. 9, Apr. 15, 2019, pp. 5706-5714.

Zhvansky, E. et al., "Comparison of dimensionality reduction methods in mass spectra of astrocytoma and glioblastoma tissues", Mass Spectrometry, vol. 10, No. 1, A0094, Mar. 13, 2021, 9 pages.

* cited by examiner

| | 1 | 2 | 3 | 4 |
|---|---|---|---|---|
| A | 2064 | 603 | 503 | 100 |
| B | 454 | 100 | 1 | 150 |
| C | 504 | 150 | 150 | 1 |
| D | 100 | 2 | 1 | 100 |

FIG. 6A

| | 1 | 2 | 3 | 4 |
|---|---|---|---|---|
| A | 2064 | 603 | 503 | 100 |
| B | 454 | 100 | 1 | 150 |
| C | 504 | 150 | 150 | 1 |
| D | 100 | 2 | **50** | 100 |

FIG. 6B

| | 1 | 2 | 3 | 4 |
|---|---|---|---|---|
| A | **2211** | 603 | **552** | |
| B | **503** | | | |
| C | **553** | | | |
| D | | | | |

FIG. 6C

SYSTEMS AND METHODS FOR ERROR CORRECTION IN FAST SAMPLE READERS

CROSS-REFERENCE TO RELATED APPLICATION

This application is a National Stage Application of PCT/IB2022/062708, filed on Dec. 22, 2022, which claims the benefit of U.S. Provisional Application No. 63/297,423, filed on Jan. 7, 2022, the entire disclosures of which are incorporated herein by reference in their entireties. To the extent appropriate, a claim of priority is made to each of the above disclosed applications.

BACKGROUND

Acoustic Ejection Mass Spectrometry (AEMS) is a high-throughput analytical platform, where nano-liter sized sample droplets, or aliquots, are ejected acoustically from a sample well plate in a non-contact manner, and captured in an open port interface (OPI). The sample is diluted and transferred from the OPI to a mass spectrometer (MS) for analysis. Each ejection typically generates a one-second baseline wide peak on the standard system setup, which determines the analytical throughput to one well every second, or ~1 Hz. Although the 1 Hz speed has been significantly faster than the routine liquid chromatography-MS or flow-injection-MS, it may be advantageous to have even faster throughput speeds for some assays such as, e.g., 2 Hz and up to 3 Hz and more. One way to improve the throughput speed is to enable a sharper peak width, the use of a lower viscosity carrier solvent (e.g., acetonitrile), a substantially higher nebulizer gas flowrate, and/or a significant hardware modification. It should be noted that these changes may not be able to be used for a wide range of assays in a robust way.

Summary

In one aspect, the technology relates to a method for detecting a signal measurement error in one or more samples, the method including providing a well plate including a plurality of wells, the plurality of wells including error correction wells and sample wells, each sample well including a single sample, and each error correction well including a mixture of samples identical to the single samples in two or more of the sample wells; receiving at least one aliquot from each of the plurality of wells at a sample receiver; measuring a signal for the received at least one aliquot; calculating an expected signal for each of the error correction wells; comparing the measured signal to the calculated expected signal for each error correction well; determining, based on the comparison, whether an error exists in the signal of at least one of the sample wells; and when the error exists, correlating the error to one or more sample wells.

In an example of the above aspect, measuring the signal includes measuring a height of a peak of the signal, an area under the peak of the signal, or a signal level at a given percentage of the peak height. For example, the given percentage may be 25%, 50% or 75% of the peak height. In another example, the intensity of the measured signal for a majority of the sample wells is within a desired dynamic range. In yet another example, a signal measurement error for a majority of the error correction wells is within a desired range. In still another example, the method further includes calculating the expected signal for each error correction well based on the measured signals from each sample well containing samples present in the error correction well.

In another example of the above aspect, the method further includes calculating the expected signal for each correction well by performing a sum of the signals measured for each sample well containing a sample present in the error correction well. In another example, the method includes introducing a plurality of aliquots from the well plate into the sample receiver, the sample receiver being connected to, e.g., a measurement device. In an example, a rate of introducing the aliquots into the sample receiver is higher than a base-line full width of the measured signal. In another example, the rate of introducing the aliquots into the sample receiver is greater than 1 Hz. In yet another example, correlating the error to the one or more sample wells comprises identifying one or more sample wells for which the signal is in error.

In yet another example of the above aspect, the method further includes correcting the error in the one or more sample wells. In another example, correcting the error includes measuring another signal from the one or more sample wells at a slower rate; changing parameters in a deconvolution of the measured signal; and/or changing measurement settings. In yet another example, the method further includes inputting one of the measured signal or the corrected signal for one of the sample wells in a deconvolution algorithm of the measured signal. In yet another signal, correlating the error includes correlating the error to an individual sample well.

In another example of the above aspect, calculating the expected signal for each correction well includes performing a sum of previously known signals for the sample wells for each sample present in the error correction well. In yet another example, the previously known signals for the sample wells are each equal to zero. In another example, the previously known signals for the sample wells are not identical to each other.

In another aspect, the technology relates to a mass analyzer that includes a sample receiver; a mass analysis device fluidically coupled to the sample receiver; a processor operatively coupled to the sample receiver and to the mass analysis device; and a memory coupled to the processor, the memory storing instructions that, when executed by the processor, perform a set of operations. In one aspect, the set of operations include providing a well plate including a plurality of wells, the plurality of wells including error correction wells and sample wells, each sample well including a single sample, and each error correction well including a mixture of samples identical to the single samples in two or more of the sample wells; receiving, at the sample receiver, at least one aliquot from each of the plurality of wells; measuring a signal for the received at least one aliquot with the mass analysis device; calculating, via the processor, an expected signal for each of the error correction wells; comparing, via the processor, the measured signal to the calculated expected signal for each error correction well; determining, via the processor, whether an error exists in the signal of at least one of the sample wells based on the comparison; and when the error exists, correlating, via the processor, the error to one or more sample wells.

In another example of the above aspect, the single sample includes one or more compounds. In an example, the mass analyzer further includes a non-contact sample ejector; wherein receiving the at least one aliquot includes introducing, with the non-contact sample ejector, the at least one aliquot from the well plate into the sample receiver. In another example, the non-contact sample ejector includes an acoustic droplet ejector. In yet another example, a rate of the aliquot ejections by the non-contact sample ejector is higher than a base-line full width of the measured signal. In still another example, the rate of the aliquot ejections is greater than 1 Hz. In another example, each sample is included in at least two error correction wells of the well plate. In another example, the mass analyzer further includes an ionization element, wherein the set of operations further includes ionizing the plurality of aliquot ejections by the ionization element towards the mass analysis device. In yet another example, the mass analysis device includes at least one of a differential mobility spectrometer (DMS), a mass spectrometer (MS), and a DMS/MS. In another example of the above aspect, the sample receiver includes an open port interface. In yet another example, the well plate includes sixteen wells arranged in a 4×4 array; wherein eleven wells of the sixteen wells are sample wells; and wherein five wells of the sixteen wells are error correction wells. In another example, the well plate includes one of 384 wells and 1536 wells.

In another aspect, the technology relates to a sample detection system that includes a sample receiver; a detection device operatively coupled to the sample receiver; a processor operatively coupled to the sample receiver and to the detection device; and a memory coupled to the processor, the memory storing instructions that, when executed by the processor, perform a set of operations. In one example, the set of operations include providing a repository including a plurality of sample repositories, the plurality of sample repositories including error correction repositories and sample repositories, each sample repository including a single sample, and each error correction repository including a mixture of samples identical to the single samples in two or more of the sample repositories; receiving, at the sample receiver, at least one aliquot from each sample repository; measuring a signal for the received at least one aliquot with the detection device; calculating, via the processor, an expected signal for each of the error correction repositories; comparing, via the processor, the measured signal to the calculated expected signal for each error correction repository; determining, via the processor, whether an error exists in the signal of at least one of the sample repositories based on the comparison; and when the error exists, correlating, via the processor, the error to one or more sample repositories.

In an example of the above aspect, the detection device is a light detection device or a radiation device. In yet another example, the measured signal is a light intensity. In still another example, the measured light intensity includes a UV light intensity.

BRIEF DESCRIPTION OF THE DRAWINGS

FIGS. 6A-6C depict measurement results for a well plate in accordance with various embodiments described herein.

DETAILED DESCRIPTION

High-throughput sample analysis is typically advantageous to the drug discovery process. Bioanalysis technologies include colorimetric microplate-based readers. Such readers, however, are often constrained by linear dynamic range as well as the need for label attachment schemes which have the propensity to modify equilibrium and kinetic analysis. Mass spectrometry (MS) based methods can achieve label-free, universal mass detection of a wide range of analytes with improved sensitivity, selectivity, and specificity. For example, the sample is delivered to the mass spectrometer at a rate of multiple samples per second, but a limiting factor for the throughput may be the introduction of measurement error when the delivery speed is as high as, e.g., 2 or 3 samples per second, or even higher. One solution to this problem may include using specific wells in a well plate, defined as error correction wells, to identify and correct errors in the signal measurement of the sample wells in the well plate.

Figure 1:
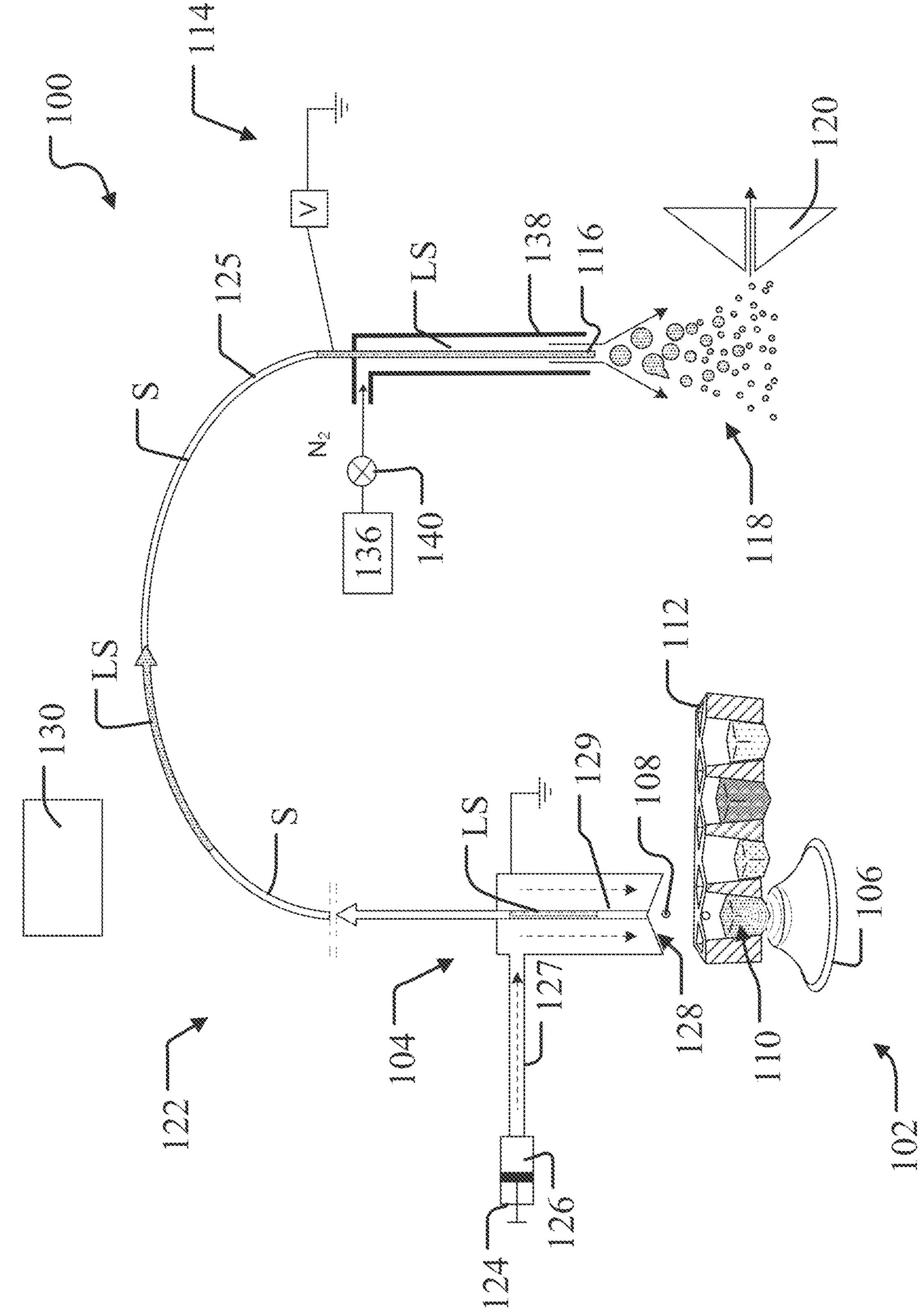
FIG. 1 is a schematic view of an example system combining acoustic droplet ejection (ADE) with an open port interface (OPI) sampling interface and electrospray ionization (ESI) source.

For illustrative purposes, FIG. 1 is a schematic view of an example system 100 combining an ADE 102 with an OPI sampling interface 104 and an ESI source 114, along with a mass spectrometer (MS) 120. Such a system 100 may be referred to as an acoustic ejection mass spectrometer system (AEMS). The system 100 may include a mass analysis instrument such as a MS device for ionizing and mass analyzing analytes received within an open end of the sampling OPI 104. Such a system 100 is described, for example, in U.S. Pat. No. 10,770,277, the disclosure of which is incorporated by reference herein in its entirety. The ADE 102 includes an acoustic ejector 106 that is configured to eject a droplet or aliquot 108 from a reservoir 110 of a well plate 112 into the open end of sampling OPI 104. As shown in FIG. 1, the example system 100 generally includes the sampling OPI 104 in liquid communication with the ESI source 114 for discharging a liquid containing one or more sample analytes (e.g., via electrospray electrode 116) into an ionization chamber 118, and a mass analyzer detector (e.g., a MS depicted generally at 120) in communication with the ionization chamber 118 for downstream processing and/or detection of ions generated by the ESI source 114. Due to the configuration of the nebulizer nozzle 138 and electrospray electrode 116 of the ESI source 114, samples ejected therefrom are transformed into small-volume liquid droplets flying in a gas. A liquid handling system 122 (e.g., including one or more pumps 124 and one or more transfer conduits 125) provides for the flow of liquid from a solvent reservoir 126 to the sampling OPI 104 and from the sampling OPI 104 to the ESI source 114. As ESI source 114 allows for the formation of multiple charged ions and are, therefore, more applicable to a variety of applications, they are described within the application for consistency. The technologies described herein, however, may also be utilized for systems that incorporate a plurality of atmospheric pressure chemical ionization (APCI) sources.

In FIG. 1, the solvent reservoir 126 (e.g., containing a liquid transport solvent) can be liquidly coupled to the sampling OPI 104 via a supply conduit 127 through which the liquid can be delivered at a selected volumetric rate by the pump 124 (e.g., a reciprocating pump, a positive displacement pump such as a rotary, gear, plunger, piston, peristaltic, diaphragm pump, or other pump such as a gravity, impulse, pneumatic, electrokinetic, and centrifugal pump), all by way of non-limiting example. As discussed in greater detail below, the flow of liquid into and out of the sampling OPI 104 occurs within a sample space accessible at the open end such that one or more droplets or aliquots 108 can be introduced into the liquid boundary 128 at the sample tip and subsequently delivered to the ESI source 114.

The system 100 includes an ADE 102 that is configured to generate acoustic energy that is applied to a liquid contained within a reservoir 110 that causes one or more droplets 108 to be ejected from the reservoir 110 into the open end of the sampling OPI 104. A controller 130 can be operatively coupled to and configured to operate any aspect of the system 100. This enables the acoustic transducer of the acoustic ejector 106 to inject droplets 108 into the sampling OPI 104 as otherwise discussed herein substantially continuously, or for selected portions of an experimental protocol, by way of non-limiting example. Other types of sample introduction systems, such as gravity-based droplet systems may be utilized. ADE 102 and other non-contact ejection systems may be advantageous because of the high sample throughput that may be achieved. Controller 130 can be, but is not limited to, a microcontroller, a computer, a microprocessor, or any device capable of sending and receiving control signals and data, as described below with respect to the computing device illustrated in FIG. 7. Wired or wireless connections between the controller 130 and the remaining elements of the system 100 are not depicted but would be apparent to a person of skill in the art.

As shown in FIG. 1, the ESI source 114 (when utilized) can include a source 136 of pressurized gas (e.g., nitrogen, air, or a noble gas) that supplies a high velocity nebulizing gas flow to the nebulizer nozzle 138 that surrounds the outlet tip of the electrospray electrode 116. As depicted, the electrospray electrode 116 protrudes from a distal end of the nebulizer nozzle 138. The pressured gas interacts with the liquid discharged from the electrospray electrode 116 to enhance the formation of the sample plume and the ion release within the plume for sampling by mass analyzer detector 120, e.g., via the interaction of the high-speed nebulizing flow and jet of liquid sample (e.g., analyte-solvent dilution). The liquid discharged may include liquid samples LS received from at least one reservoir 110 of the well plate 112. The liquid samples LS are diluted with the solvent S and typically separated from other samples by volumes of the solvent S (hence, as flow of the solvent S moves the liquid samples LS from the OPI 104 to the ESI source 114, the solvent S may also be referred to herein as a transport liquid). The nebulizer gas can be supplied at a variety of flow rates, for example, a flow rate in a range from about 0.1 L/min to about 40 L/min, which can also be controlled under the influence of controller 130 (e.g., via opening and/or closing valve 140).

It will be appreciated that the flow rate of the nebulizer gas can be adjusted (e.g., under the influence of controller 130) such that the flow rate of liquid within the sampling OPI 104 can be adjusted based, for example, on suction/aspiration force generated by the interaction of the nebulizer gas and the analyte-solvent dilution as it is being discharged from the electrospray electrode 116 (e.g., due to the Venturi effect/shock formation). The ionization chamber 118 can be maintained at atmospheric pressure, though in some examples, the ionization chamber 118 can be evacuated to a pressure lower than atmospheric pressure.

It will also be appreciated by a person skilled in the art and in light of the teachings herein that the mass analyzer detector 120 can have a variety of configurations. Generally, the mass analyzer detector 120 is configured to process (e.g., filter, sort, dissociate, detect, etc.) sample ions generated by the ESI source 114. By way of non-limiting example, the mass analyzer detector 120 can be a triple quadrupole mass spectrometer, or any other mass analyzer known in the art and modified in accordance with the teachings herein. Other non-limiting, exemplary mass spectrometer systems that can be modified in accordance with various aspects of the systems, devices, and methods disclosed herein can be found, for example, in an article entitled "Product ion scanning using a Q-q-Q linear ion trap (Q TRAP) mass spectrometer," authored by James W. Hager and J. C. Yves Le Blanc and published in Rapid Communications in Mass Spectrometry (2003; 17:1056-1064); and U.S. Pat. No. 7,923,681, entitled "Collision Cell for Mass Spectrometer," the disclosures of which are hereby incorporated by reference herein in their entireties.

Other configurations, including but not limited to those described herein and others known to those skilled in the art, can also be utilized in conjunction with the systems, devices, and methods disclosed herein. For instance, other suitable mass spectrometers include single quadrupole, triple quadrupole, ToF, trap, and hybrid analyzers. It will further be appreciated that any number of additional elements can be included in the system 100 including, for example, an ion mobility spectrometer (e.g., a differential mobility spectrometer) that may be disposed between the ionization chamber 118 and the mass analyzer detector 120 and configured to separate ions based on their mobility difference in high-field and low-field). Additionally, it will be appreciated that the mass analyzer detector 120 can comprise a detector that can detect the ions that pass through the analyzer detector 120 and can, for example, supply a signal indicative of the number of ions per second that are detected.

The technologies described herein are used to deconvolve peaks in a sample trace generated by the system 100. In AEMS, MS signal peaks have a similar shape for a given assay under the same analytical conditions (e.g., carrier flow, analyte, ejection volume, and source condition). In addition, the relative constant delay time between the acoustic ejection event and the appearance of the MS signal enables prediction of the time when the ejection signal would occur. With the combined utilization of the predicted signal appearance timing and the peak-shape, the merged peaks may be deconvolved, allowing the determination of the intensity from each ejection even though the delay time between samplings are significantly shorter than the baseline peak-width. Intensity of the convolved peaks may be obtained via a number of methods, described below.

Figure 2:
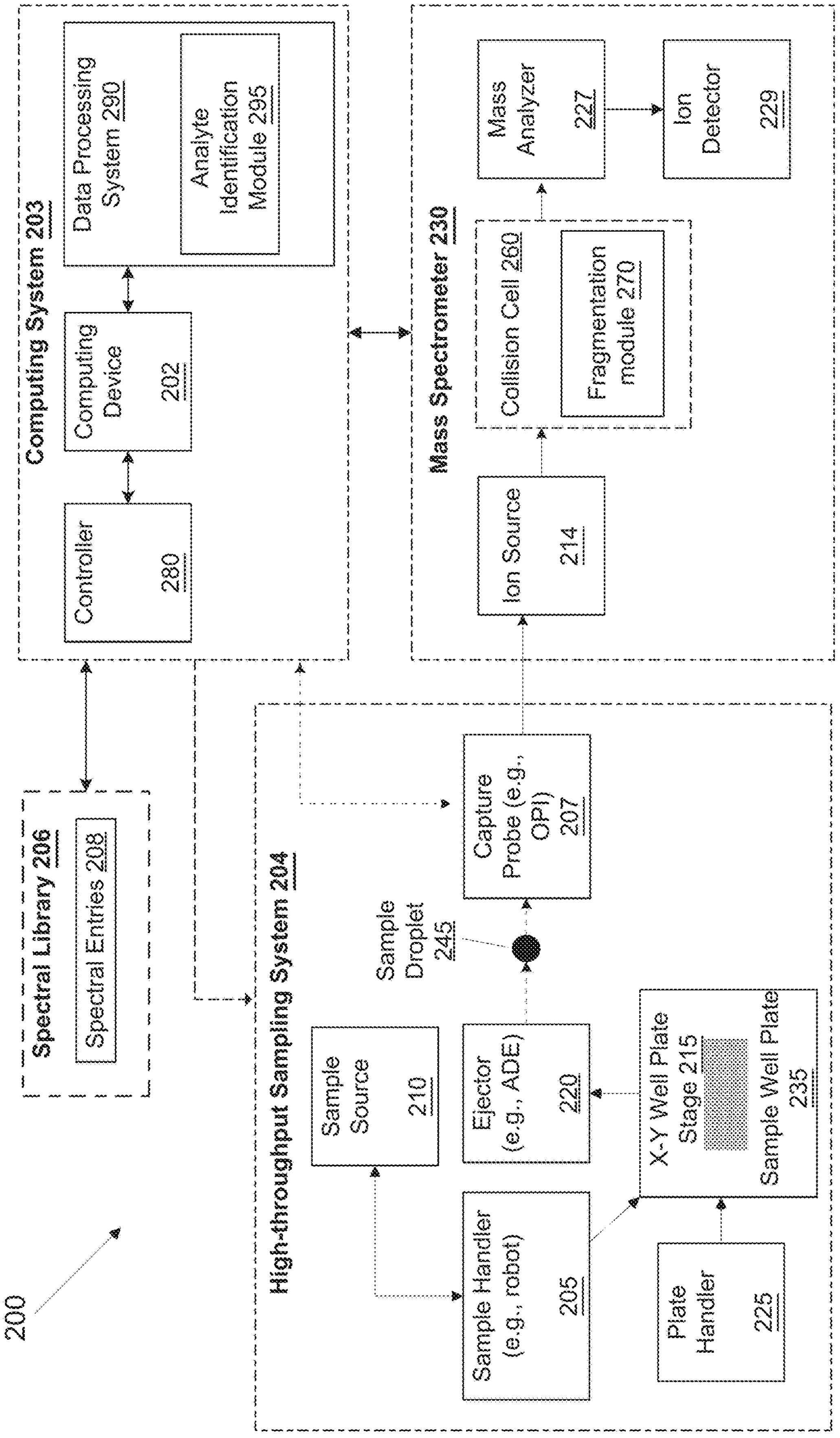
FIG. 2 is a schematic diagram illustrating operation of another particular example system in accordance with various embodiments described herein.

FIG. 2 is schematic diagram illustrating operation of an example system combining acoustic droplet ejection (ADE) with an open port interface (OPI) sampling interface and electrospray ionization (ESI) source. In the illustrated example, the system 200 is operative to perform high-throughput mass spectrometry analysis. Similar to the system 100 of FIG. 1, the system 200 includes a sampling system 204, a mass spectrometer 230, a computing system 203, and optionally a spectral library 206 that may include a plurality of spectral entries 208.

In various aspects, the sampling system 204 may include at least one of a sample source 210 (similar to the reservoir 110 or well plate 112 of FIG. 1), a sample handler 205, a capture probe 207, an X-Y well plate stage 215, an ejector 220, and a plate handler 225. The sample source 210 and the sample handler 205 are operative to retrieve collections of samples from the sample source 210 and to deliver the retrieved collections to capture locations associated with sample capture probe 207. The system 200 may be operative to independently capture selected ones of the plurality of samples at the capture locations, e.g., capture probe 207, to optionally dilute the samples and to transfer the captured samples to mass spectrometer 230 for mass analysis. In some embodiments, the sample source 210 may include a set of well plates in a storage housing and/or liquid for adding to well plates. The sample source 210 may include part of a liquid handling system that manipulates and/or injects liquid into the well plates. The sample handler 205 includes one or more electro-mechanical devices (e.g., robotics, conveyor belts, stages, and the like) that are capable of transferring samples (e.g., well plates) from the sample source 210 to other components of the sampling system 204 and/or to other components, such as the ejector 220 and/or the capture probe 207. As an example, the sample handler 205 may transfer a sample well plate 235 to the ejector 220 or the plate handler 225.

In various aspects, the ejector 220 is operable to eject droplets 245 from the wells of the well plate 235. The size of the droplet may typically be from 1 to 25 nanoliters. The ejector 220 may be any type of suitable ejector, such as an acoustic ejector, a pneumatic ejector, or another type of contactless ejector. In an example, the plate handler 225 receives a well plate 235 from the sample handler 205. The plate handler 225 transports the well plate 235 to a capture location that may be aligned with the capture probe 207. Once in the capture location, the ejector 220 ejects droplets 245 from one or more wells of the well plate 235. The plate handler 225 may include one or more electro-mechanical devices, such as a translation stage 215 that translates the well plate 235 in an X-Y plane to align wells of the well plate 235 with the ejector 220 and/or or the capture probe 207.

In various aspects, the mass spectrometer 230 includes at least one of an ion source (e.g., ionization source) 214, a mass analyzer 227, an ion detector 229, and a collision cell 260. The mass spectrometer 230 can be operative, for example, through use of ion source(s) or generator(s) 214 to produce sample ions of the sample introduced into the mass spectrometer 230. The collision cell 260 is operative to fragment the precursor ions produced by the ion source 214 to generate product ions (fragment ions) derived from the precursor ions. The mass spectrometer 230 is further operative to filter and detect selected ions of interest from the sample ions through the use of the mass analyzer 227 and ion detector 229. The mass analyzer 227 is operative to analyze the sample ions and produce a mass spectrometry (MS) dataset comprising all ion current signals from the sample ions.

In some aspects, the mass spectrometer 230 is operative to perform tandem mass spectrometry analysis through the use of the collision cell 260. The collision cell 260 may further include a fragmentation module 270 operative to apply an energy to the selected precursor ions and cause the selected precursor ions to undergo fragmentation and generate product ions. The fragmentation module may include at least one of collision induced dissociation (CID), surface induced dissociation (SID), electron capture dissociation (ECD), electron transfer dissociation (ETD), metastable-atom bombardment, photo-fragmentation, or combinations thereof.

It will also be appreciated by a person skilled in the art and in light of the teachings herein that the mass analyzer 227 can have a variety of configurations. Generally, the mass analyzer 227 is operative to process (e.g., filter, sort, dissociate, detect, etc.) sample ions generated by the ion source 214. By way of non-limiting example, the mass analyzer 227 may be a triple quadrupole mass spectrometer, or any other mass analyzer known in the art and modified in accordance with the teachings herein.

In various aspects, the computing system 203 may include a computing device 202 as described above, a controller 280, and a data processing system 290. The controller 280 may be in the form of electronic signal processors and in electrical communication with other subsystems within the system 200. The controller 280 may be operative to coordinate some or all of the operations of the pluralities of the various components of the system 200. In one example, the controller 280 may be a controller for the mass spectrometer 227 and may be used as the primary controller for controlling components in addition to those components housed within the mass spectrometer 227. As such, the controller 280 may be considered the main or central controller that orchestrates, or communicates with, the other controllers to carry out the operations discussed herein in a more efficient manner.

In various aspects, the data processing system 290 may include various components and modules operative to process mass spectrometry data and to provide real-time feedback to users and other subsystems. In some embodiments, the data processing system 290 further includes an analyte identification module 295. The analyte identification module 295 may be operative to perform a library search and predict compound identity of a target analyte in a test sample, optionally through use of the trained machine learning algorithm.

In operation, the sampling system 204 (including sample source 210 and sample handler 205) can iteratively deliver independent samples from a plurality of samples (e.g., a sample from a well of well plate 235) to the capture probe 207. The capture probe 207 can dilute and transport each such delivered sample to the mass spectrometer 230 disposed downstream of the capture probe 207 for ionizing the diluted sample. The mass analyzer 227 can receive generated ions from the ion source 214 and/or the collision cell 260 for mass analysis. The mass analyzer 227 is operative to selectively separate ions of interest from generated ions received from the ion source 214 and to deliver the ions of interest to the ion detector 229 that generates a mass spectrometer signal indicative of detected ions to the computing system 203. In some aspects, the separate ions of interest may be indicated in an analysis instruction associated with that sample. In some aspects, the separate ions of interest may be indicated in an analysis instruction identified by an indicia physically associated with the plurality of samples.

The system 200 may include a commercial product such as a Biomek computer available from Beckman Coulter Life Sciences, which is in operative communication with a mass spectrometer 230 and a controller for the capture probe 207, which may include, for example, a SCIEX OS or Analyst® computer available from SCIEX. The Analyst® or SCIEX OS computer includes a control controller for the capture probe 207, represented for example by SCIEX open port probe (OPP) (also referred to as OPI) software, and a controller for the mass spectrometer 230, which may be the Analyst® computer. The mass spectrometer 230 and the controller for capture probe 207 may be further in operative communication with an ejector 220 and an X-Y Well Plate Stage 215, which may be, for example, a liquid droplet ejector with embedded computer or processor. For the purposes of this disclosure, these distributed controller components may collectively be considered to be a system controller, and depending upon the configuration, may be centralized or distributed as is the case here. For instance, one of the controllers or controller components may send signals to the other controllers to control the respective devices.

In one particular example, the high-throughput system 200 employs the ADE-OPI-MS technology. The ADE-OPI-MS system according to the present disclosure relies on acoustic dispensing of droplets directly from the wells of the plate under analysis. The acoustically dispensed droplets, which are typically at nanoliter scale, with precise control and independent of the sample solvent, are acoustically ejected from the ejected sample and introduced to a vortex at the opening of the OPI and delivered directly to the ionization source of the MS for detection. The substantially small samples required, coupled with the method's resilience in handling unpurified samples, make this technology advantageous for direct sampling from the well plate. The ADE-OPI-MS system and method also offer significant speed advantages: with an average analysis time of 1-2 seconds per sample and a small quantity of 1-10 nanoliter per sample, such that a typical well plate containing 384 wells can be analyzed in under 15 min. Thus, the ADE-OPI-MS system advantageously enables high-throughput analysis of a large quantity of samples and generate a large volume of data within a meaning time frame such as a day. In addition, the ADE-OPI is compatible with both nominal and high-resolution mass spectrometers, allowing rapid quantification with the former, and extensive analyte identification with the latter. More examples of the ADE-OPI-MS system and various components thereof can be found in U.S. Pat. No. 10,770,277, the disclosure of which is incorporated by reference herein in its entirety. It should be noted that although the mass spectrometer 230 is discussed herein, principles of the above embodiments may be applicable to any other mass analyzing device, or to any sample detection device.

Figure 3:
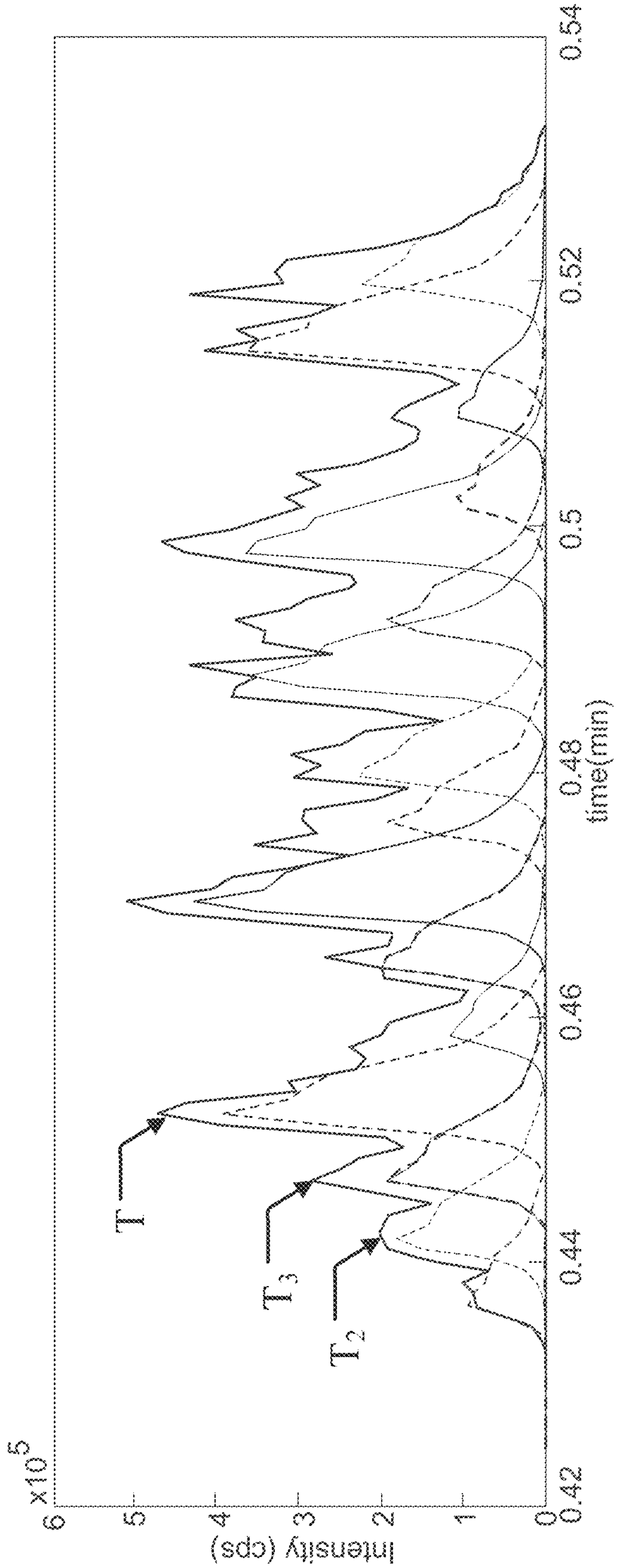
FIG. 3 depicts a plot of deconvoluted peaks associated with a plurality of ejections, as well as a merged signal generated by a mass analysis device.

The challenges associated with overlapping signals are depicted in FIG. 3, which illustrates a plot of deconvoluted peaks associated with a plurality of ejections, as well as a merged signal generated by a mass analysis device. The trace T is the merged signal of the data collected by the mass analysis device such as, e.g., the mass spectrometer 230 discussed above with respect to FIG. 2. The underlying signals associated with each ejection are located below the trace, shown for example, in broken lines. These underlying signals merge into the trace T, which is displayed on the mass analysis device or an associated computer such as, e.g., the computing device 202 discussed above with respect to FIG. 2. The peaks $T_2$ and $T_3$ illustrate the challenges in determining peak intensities in the absence of the technologies described herein. While peaks $T_2$ and $T_3$ of the trace T are markedly different in height, the underlying peaks from each ejection are nearly identical. Note that the intensity of ejections 2 and 3 (under the peaks T2 and T3) are nearly identical, which does not correspond at first glance to the peaks $T_2$ and $T_3$ of trace T in FIG. 3. Various deconvolution processes are typically used to enable these accurate determinations of peak intensity, regardless of displayed signal overlap.

Methods to determine the signal intensity are well-known in the art and include calculating an area of a convolved peak, which is based on the known peak shape. For example, the area may be calculated for two or more peaks, or for all peaks, of trace T, $T_2$, or $T_3$. In other examples, the signal intensity may be based on one or more of the peak height, peak width, and peak area. The signal intensity may be based on a pre-determined percentage of the peak height (e.g., about 1%, about 3%, about 5%, about 10%, about 25%, about 50%, about 60%, about 70%, about 75%, about 95%, about 97%, and about 99% of the peak height). A signal intensity based on peak full-width half-maximum (FWHM) may also be utilized.

Figure 4:
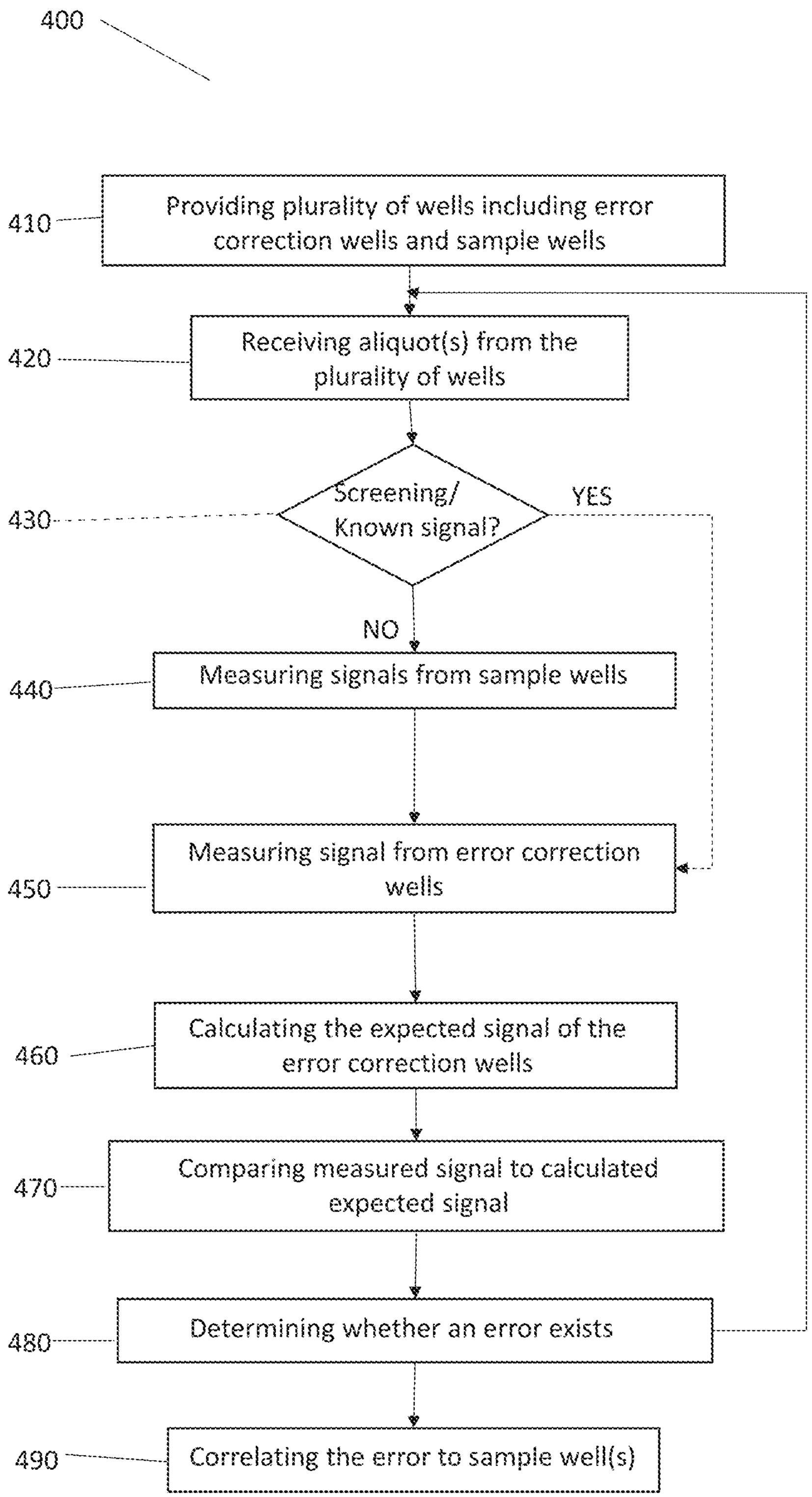
FIG. 4 is a flow chart depicting a method for detecting a signal measurement error in one or more samples in accordance with various embodiments described herein.

FIG. 4 is a flow chart depicting an example method 400 for detecting a signal measurement error in one or more samples in accordance with various embodiments described herein. For the sole purpose of convenience, method 400 is described through use of the example systems 100 or 200. However, it is appreciated that the method 400 may be performed by any suitable system.

Operation 410 includes providing error correction wells and/or sample wells. Specifically, operation 410 includes providing a well plate that includes a plurality of wells, the plurality of wells including error correction wells and sample wells. For example, each sample well may include a single sample, and each error correction well may include a mixture of samples from two or more of the sample wells. As another example, each sample from the sample wells may also be included in at least two error correction wells of the well plate. It should be noted that the term "sample" may refer to the contents of a well that may include a single compound or to a plurality of compounds, so that an individual sample may in fact be composed of more than one compound.

Operation 420 includes receiving one or more aliquots from wells of the well plate, e.g., from the error correction wells and from the sample wells. For example, in the case of a mass analyzer, the aliquots are ejected via a non-contact sample ejector, from the well plate into the sample receiver. The mass analyzer may be, e.g., a DMS, an MS, or a DMS/MS, and the sample receiver may include an OPI. For example, the non-contact sample ejector includes an ADE. In addition, the rate of the aliquot ejections by the non-contact sample ejector may be higher than a base-line full width of the measured signal. For example, the rate of the aliquot ejections by the non-contact sample ejector is greater than 1 well per second, e.g., greater than 1 Hz. The rate of aliquot ejections may also be equal to or higher than 2 or 3 wells per second or more, e.g., 2 Hz or 3 Hz and more. The mass analyzer may also include an ionization element, and operation 420 may include ionizing the aliquot ejections towards the mass analyzer.

Operation 430 includes determining whether the error correction is for a screening application or a measurement application. In a screening application, the signal emanating from each of the sample wells is known in advance, e.g., known to be equal to substantially zero, or equal to other known values. It should be noted that screening applications also apply to cases where although the signal emanating from the sample wells is non-zero, the signal for each sample well is known prior to performing any measurements. As such, the known signal for each sample well may be the same for all the sample wells or may be different for different sample wells, but is typically known prior to measurement of the signal. A difference between a screening application and a measurement application is that in a screening application, only the signal emanating from the error correction wells is measured when determining whether an error exists in any of the sample wells. When operation 430 determines that the application is not a screening application, the method 400 continues to operation 440 where operation 440 includes measuring the signal for each of the sample wells of the well plate.

When operation 430 determines that the application is a screening application, or after operation 440 where a signal is measured for each of the sample wells, the method 400 continues to operation 450 where the signal from each of the error correction wells is measured. For example, measuring the signal of a given aliquot for either a sample well or an error correction well may include measuring the height of a peak of the signal as illustrated in, e.g., FIG. 3, the area under the peak of the signal, or the full-width-half maximum of the peak of the signal. The intensity of the measured signal for all, or for almost all, of the measured signals, may be within a desired dynamic range. Similarly, the signal measurement error for all, or for most, of the measured signals is also within a desired range.

Operation 460 includes calculating an expected signal for the error correction wells. Calculating the expected signal of a given error correction well may be accomplished by performing a sum of the signals for each sample present in the error correction well, whether the sample well signal is previously known, as in the case of a screening application, or whether the sample well signal is measured. Operation 460 includes calculating the expected signal for a given error correction well based on the signal of each of the samples that are contained in the error correction well. For example, if an error correction well includes samples 1, 2, 3 and 4, then the calculated expected signal for the error correction well may be performed by adding the signals from the sample well that includes sample 1, the sample well that includes sample 2, the sample well that includes sample 3, and the sample well that includes sample 4. If the respective signals of the above samples are equal to A, B, C and D, the calculated expected signal for the error correction well that holds these four (4) samples may be calculated as expressed in Equation (1):

$$\text{Calculated Expected Signal} = A + B + C + D \tag{1}$$

Alternatively, the expected signal may be determined by taking into account the relative concentrations of each of the samples in the error correction well. Accordingly, the sum expressed in Equation (1) above may be further changed to a pro-rated sum of the signals measured in each sample well weighted by their respective concentrations in the error correction well. For example, in the example above, if the four (4) samples have respective percentages being equal to a, b, c, and d, where the sum of a, b, c and d is equal to 1, then the calculated expected signal for the error correction well may be calculated based on the following Equation (2):

$$\text{Calculated Expected Signal} = aA + bB + cC + dD \tag{2}$$

In the case of a screening application, which corresponds to "yes" at operation 430, operation 460 returns an expected calculated intensity as being equal to zero because A=B=C=D=0. In a case where the signal from each sample well is known in advance and is non-zero (e.g., A, B, C, and D are each different than zero and may be different from each other), then Equation (1) or Equation (2) maybe used during operation 460 to calculate the expected signal. In this case, the non-zero values A, B, C and D for the sample wells are already known and are not measured.

Operation 470 includes comparing the signal measured during operation 450 for the error correction wells to the expected signal of the error correction wells calculated during operation 460. For example, for each error correction well, operation 470 includes comparing the signal measured from the error correction wells to the sum, or to the pro-rated sum of the signals of the sample wells for each sample present in the error correction well, expressed by Equation (1) or Equation (2) above. The same comparison is performed whether the signals from the sample wells are measured at operation 440, or are previously known in the case of a screening application.

Operation 480 includes determining whether an error exists in the measurement of one of the sample wells based on the comparison performed during operation 470. For example, when the measured signal for a given error correction well is different from the calculated expected signal for the same error correction well, then it may be determined that an error exists. Specifically, the error exists in a sample well that has a sample identical to the sample included in the given error correction well. As another example, an error may be due to a variety of reasons such as, e.g., when an aliquot is not properly ejected into the sample receiver, or when the signal from one sample well merges into the signal from another sample well. In an aspect, operation 480 may also include a return to operation 420 and receiving aliquots and measuring signals for other error correction wells and/or other sample wells.

Operation 490 includes correlating the error, when an error has been determined to exist, to one or more sample wells. For example, as further illustrated in FIGS. 5A-5F and 6A-6C discussed in greater detail below, a single sample well may be identified, via a process of elimination, as having an error that caused the error detected in the error correction well. In an aspect, once the single sample well is identified as having an error, then a corrective action may be performed. For example, the corrective action may include measuring another signal for the same sample well, changing parameters in the deconvolution of the measured signal, and/or changing some measurement settings.

Figure 5A:
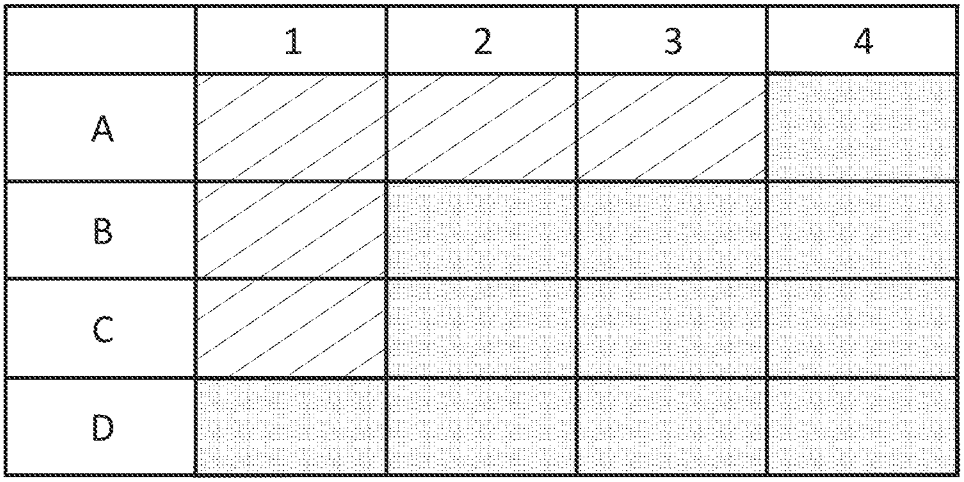
FIGS. 5A-5F depict a well plate including error correction wells and sample wells in accordance with various embodiments described herein.

FIGS. 5A-5F depict a well plate including error correction wells and sample wells in accordance with various embodiments described herein. In FIG. 5A, the error correction wells are depicted as wells A1, A2, A3, B1 and C1. The sample wells are depicted as wells A4, B2, B3, B4, C2, C3, C4, D1, D2, D3 and D4. In various aspects, each of the error correction wells may include samples from two or more of the sample walls. In other aspects, each sample in the sample wells is present in at least two of the error correction wells.

Figure 5B:
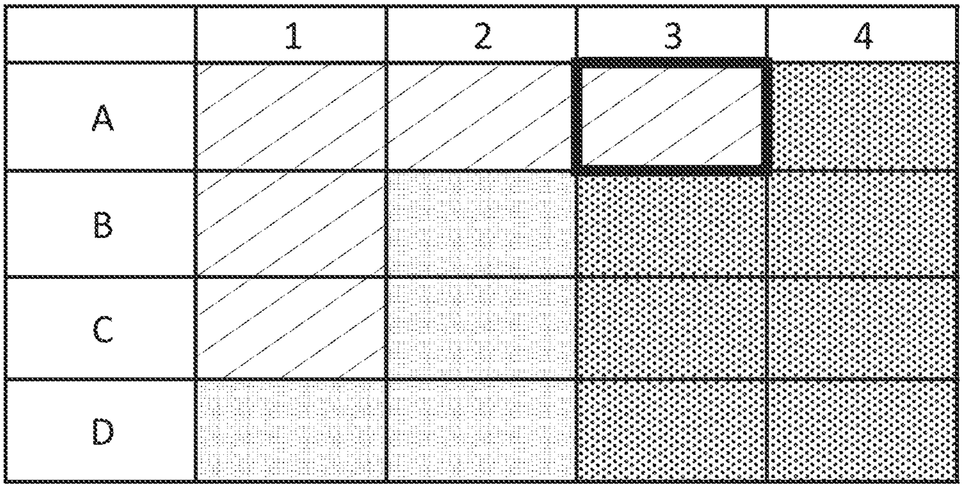

FIG. 5B illustrates the sample wells that correspond to error correction well A3. In this example, error correction well A3 includes samples identical to the samples included in each of the sample wells A4, B3, B4, C3, C4, D3 and D4. Accordingly, if there is an error in the measurement of error correction well A3, as identified in operation 480 discussed above with respect to FIG. 4, then it may be inferred that there is an error in one or more of sample wells A4, B3, B4, C3, C4, D3 and D4.

Figure 5C:
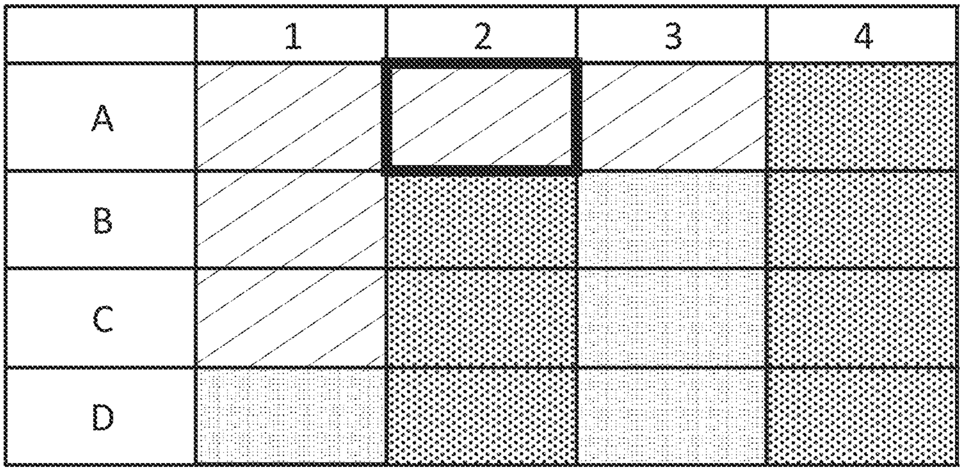

FIG. 5C illustrates the sample wells that correspond to error correction well A2. In this example, error correction well A2 includes samples identical to the samples included in each of the sample wells B2, C2, D2, A4, B4, C4 and D4. Accordingly, if there is an error in error correction well A2, as identified in operation 480 discussed above with respect to FIG. 4, then it may be inferred that there is an error in the measurement of one or more of sample wells B2, C2, D2, A4, B4, C4 and D4. Furthermore, if there is an error in both error correction wells A3 and A2, then by process of elimination, it may be inferred that the error is limited to one or more of sample wells A4, B4, C4 and D4.

Figure 5D:
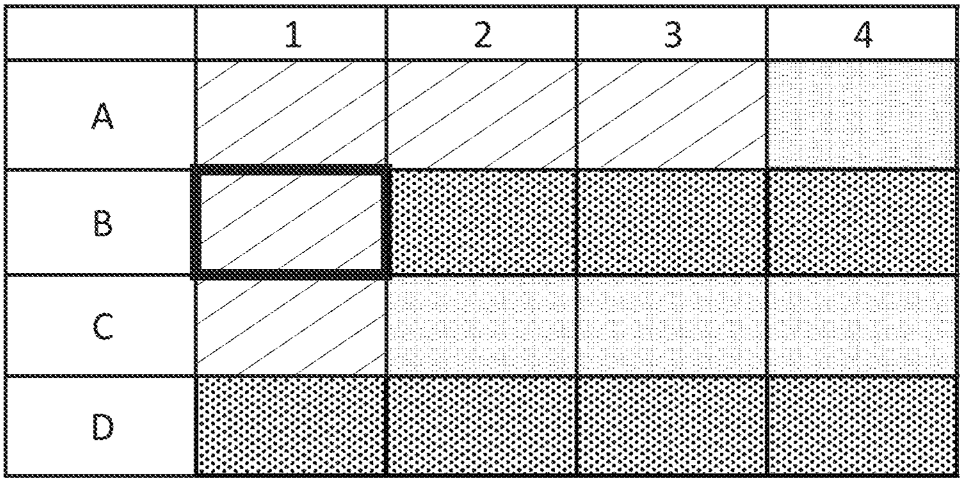

FIG. 5D illustrates the sample wells that correspond to error correction well B2. In this example, error correction well B2 includes samples identical to the samples included in each of the sample wells B2, B3, B4, D1, D2, D3 and D4. Accordingly, if there is an error in error correction well B2, as identified in operation 480 discussed above with respect to FIG. 4, then it may be inferred that there is an error in the measurement of one or more of sample wells B2, B3, B4, D1, D2, D3 and D4. Furthermore, if there is an error in error correction wells A3, A2 and B2, then by process of elimination, it may be inferred that the error is limited to one or both of sample wells B4 and D4.

Figure 5E:
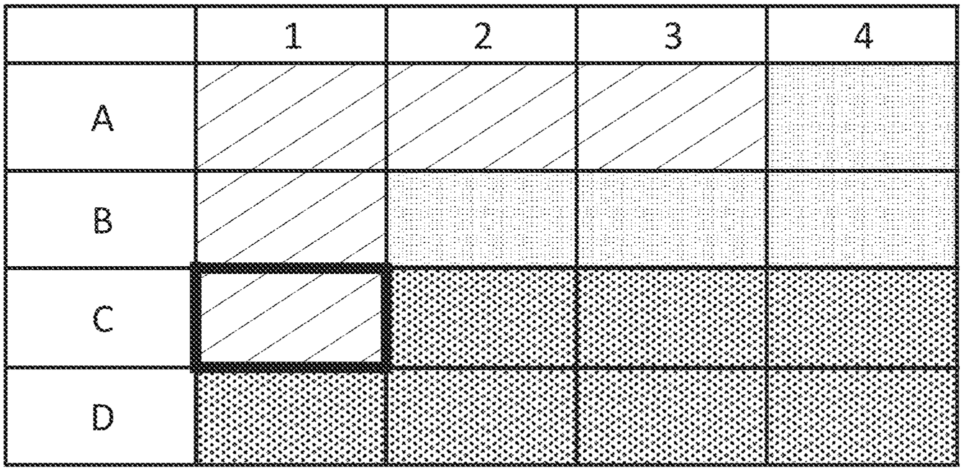

FIG. 5E illustrates the sample wells that correspond to error correction well C1. In this example, error correction well C1 includes samples identical to the samples included in each of the sample wells C2, C3, C4, D1, D2, D3 and D4. Accordingly, if there is an error in error correction well C1, as identified in operation 480 discussed above with respect to FIG. 4, then it may be inferred that there is an error in the measurement of one or more of sample wells C2, C3, C4, D1, D2, D3 and D4. Furthermore, if there is an error in error correction wells A3, A2, B2 and C1, then by process of elimination, it may be inferred that the error is limited to only sample well D4. Accordingly, by comparing the measured signal to the calculated expected signal of the error correction wells, it may be possible to narrow down the determination of sample well measurement errors to a single sample well. Accordingly, it becomes possible to narrow down the identification of a single sample well for which the measurement is in error by a process of elimination.

Figure 5F:
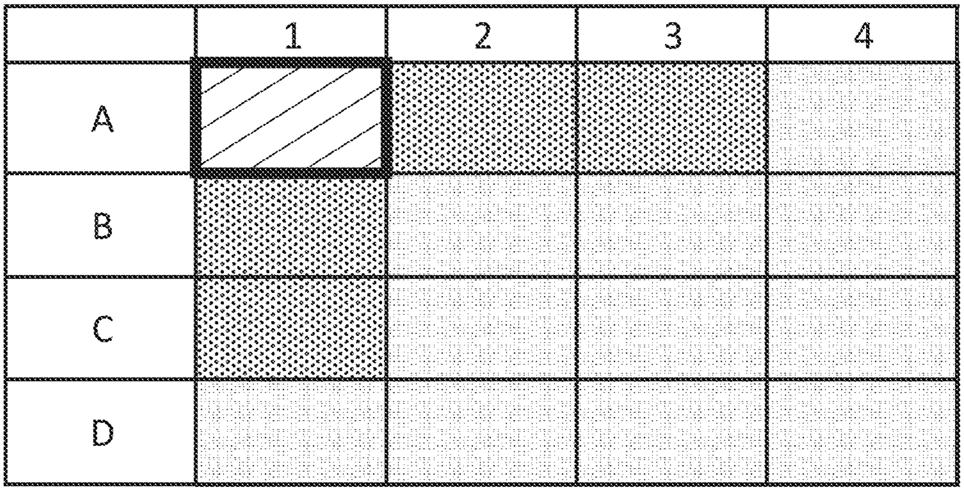

FIG. 5F illustrates the wells that correspond to error correction well A1. In this example, error correction well A1 does not include samples identical to those included in other sample wells but includes samples identical to those included in other correction wells. In this case, the wells that correspond to error correction well A1 are other error correction wells A2, A3, B1 and C1. Accordingly, if there is an error in error correction well A1, then it may be inferred that there is an error in the measurement of one or more of error correction wells A2, A3, B1 and C1. This configuration may provide redundancy in determining whether an error exists in one or more of the sample wells of the well plate.

FIGS. 6A-6C depict measurement results for a well plate in accordance with various embodiments described herein. For example, FIG. 6A depicts signal measurements for both error correction wells and sample wells. In FIG. 6, the relationships between the error correction wells and the sample wells is the same as the example discussed above with respect to FIGS. 5A-5F. For example, it is possible to determine in the case of FIG. 6A that the measured signal in error correction well A3 is equal to the sum of the signals of sample wells A4, B3, B4, C3, C4, D3 and D4, as indicated in the following Equation (3):

$$503(A3) = 100(A4) + 1(B3) + 150(B4) + 150(C3) + 1(C4) + 1(D3) + 100(D4) \quad (3)$$

The same calculations may be performed for each of the remaining error correction wells A1, A2, B1 and C1. Accordingly, FIG. 6A illustrates an example where there are no errors in the measurements of the sample wells because there is no difference or discrepancy between the measured signal and the calculated expected signal for each of the error correction wells.

FIG. 6B depicts a situation where the measured signal in one of the sample wells, sample well D3, includes an error. In this example, the measured signal of sample well D3 is equal to 50 instead of being equal to 1 as depicted in FIG. 6A. Accordingly, the calculated expected signal of any error correction well that includes a sample identical to the one in sample well D3 would be expected to be different from the measured signal of the same error correction well. For example, error correction wells A3, B1 and C1, all of which having a sample identical to the one in sample well D3, would be expected to have a discrepancy between their respective measured signals and calculated expected signals. It should be noted that A1, which includes a mixture of samples from error correction wells A3, B1 and C1, would also show a discrepancy between its measured signal and its calculated expected signal as a result.

FIG. 6C depicts the resulting calculated expected signals in each of the error correction wells A1, A3, B1, and C1 as a result of the error in sample well D3. The calculated expected signals in each of these error correction well will be different from respective their measured signals, as evidenced by a comparison of FIG. 6C and FIG. 6A. The only error correction well that remains unaffected by the error in sample well D3 is error correction well A2 because this error correction well does not include any sample identical to the one in sample well D3. Based on the comparison between FIGS. 6C and 6A, as explained above with respect to operation 490 in FIG. 4, it becomes possible to narrow down the search of the sample well with the error in measurement by a process of elimination, as discussed with reference to FIGS. 5A-5F.

Figure 7:
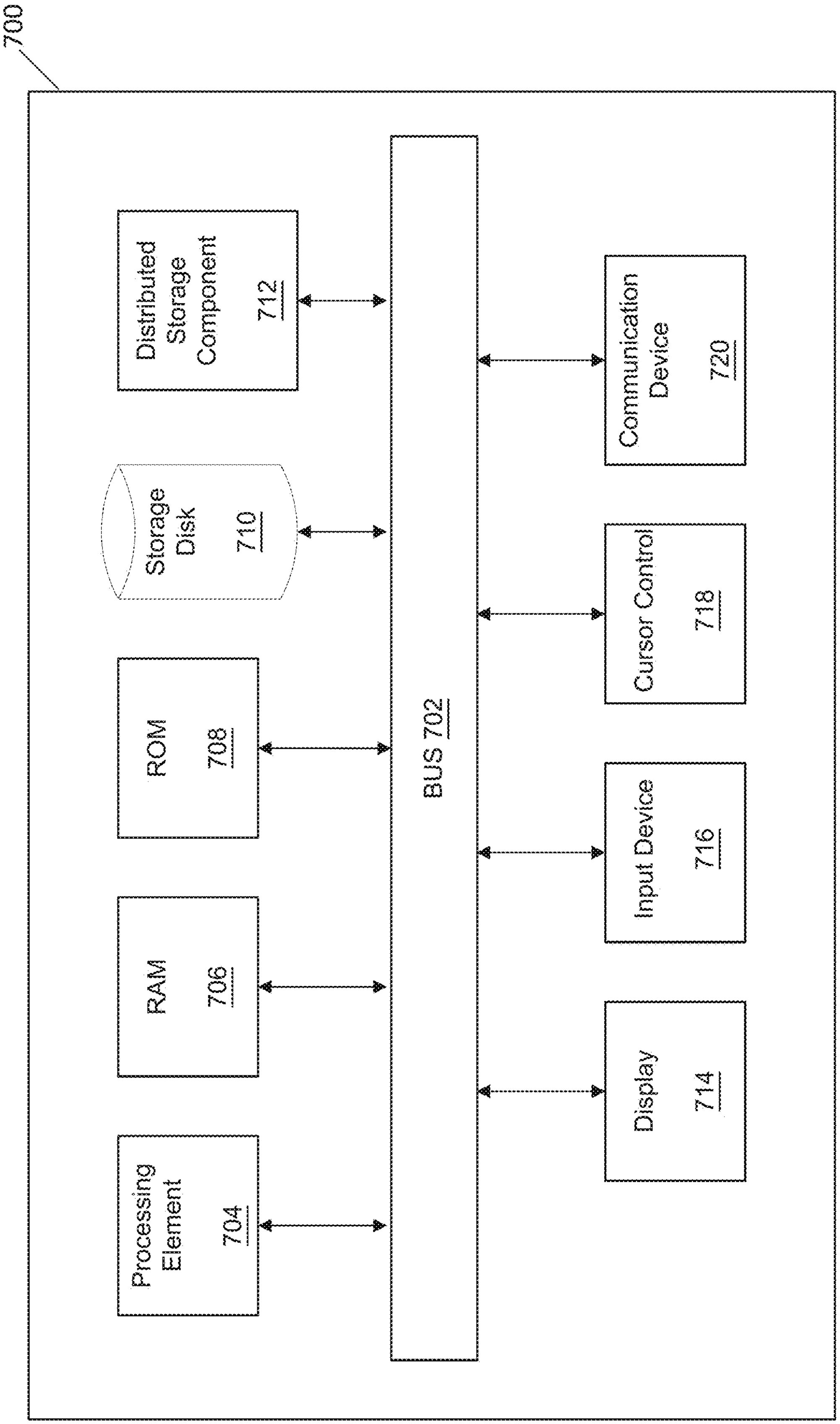
FIG. 7 depicts a block diagram of a computing device.

FIG. 7 depicts a block diagram of a computing device similar to the computing device 202 discussed above with respect to FIG. 2. In the illustrated example, the computing device 700 may include a bus 702 or other communication mechanism of similar function for communicating information, and at least one processing element 704 (collectively referred to as processing element 704) coupled with bus 702 for processing information. As will be appreciated by those skilled in the art, the processing element 704 may include a plurality of processing elements or cores, which may be packaged as a single processor or in a distributed arrangement. Furthermore, a plurality of virtual processing elements 704 may be included in the computing device 700 to provide the control or management operations for the mass analysis system 200 illustrated above.

The computing device 700 may also include one or more volatile memory(ies) 706, which can for example include random access memory(ies) (RAM) or other dynamic memory component(s), coupled to one or more busses 702 for use by the at least one processing element 704. Computing device 700 may further include static, non-volatile memory(ies) 708, such as read only memory (ROM) or other static memory components, coupled to busses 702 for storing information and instructions for use by the at least one processing element 704. A storage component 710, such as a storage disk or storage memory, may be provided for storing information and instructions for use by the at least one processing element 704. As will be appreciated, the computing device 700 may include a distributed storage component 712, such as a networked disk or other storage resource available to the computing device 700.

The computing device 700 may be coupled to one or more displays 714 for displaying information to a user. Optional user input device(s) 716, such as a keyboard and/or touchscreen, may be coupled to Bus 702 for communicating information and command selections to the at least one processing element 704. An optional cursor control or graphical input device 718, such as a mouse, a trackball or cursor direction keys for communicating graphical user interface information and command selections to the at least one processing element. The computing device 700 may further include an input/output (I/O) component, such as a serial connection, digital connection, network connection, or other input/output component for allowing intercommunication with other computing components and the various components of the mass analysis system 200 discussed above.

In various embodiments, computing device 700 can be connected to one or more other computer systems via a network to form a networked system. Such networks can for example include one or more private networks or public networks, such as the Internet. In the networked system, one or more computer systems can store and serve the data to other computer systems. The one or more computer systems that store and serve the data can be referred to as servers or the cloud in a cloud computing scenario. The one or more computer systems can include one or more web servers, for example. The other computer systems that send and receive data to and from the servers or the cloud can be referred to as client or cloud devices, for example. Various operations of the mass analysis system 200 may be supported by operation of the distributed computing systems.

The computing device 202 discussed above with respect to FIG. 2, similar to the computing device 700, may be operative to control operation of the components of the mass analysis system 200 and the sampling system 204 through a communication device such as, e.g., communication device 720, and to handle data generated by components of the mass analysis system 200 through the data processing system 200. In some examples, analysis results are provided by the computing device 700 in response to the at least one processing element 704 executing instructions contained in memory 706 or 708 and performing operations on data received from the mass analysis system 200. Execution of instructions contained in memory 706 and/or 708 by the at least one processing element 704 can render the mass analysis system 200 and associated sample delivery components operative to perform methods described herein.

The term "computer-readable medium" as used herein refers to any media that participates in providing instructions to the processing element 704 for execution. Such a medium may take many forms, including but not limited to, non-volatile media, volatile media, and transmission media. Non-volatile media includes, for example, optical or magnetic disks, such as disk storage 710. Volatile media includes dynamic memory, such as memory 706. Transmission media includes coaxial cables, copper wire, and fiber optics, including the wires that include bus 702.

Common forms of computer-readable media or computer program products include, for example, a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read.

Various forms of computer readable media may be involved in carrying one or more sequences of one or more instructions to the processing element 704 for execution. For example, the instructions may initially be carried on the magnetic disk of a remote computer. The remote computer can load the instructions into its dynamic memory and send the instructions over a telephone line using a modem. A modem local to computing device 700 can receive the data on the telephone line and use an infra-red transmitter to convert the data to an infra-red signal. An infra-red detector coupled to bus 702 can receive the data carried in the infra-red signal and place the data on bus 702. Bus 702 carries the data to memory 706, from which the processing element 704 retrieves and executes the instructions. The instructions received by memory 706 and/or memory 708 may optionally be stored on storage device 710 either before or after execution by the processing element 704.

In accordance with various embodiments, instructions operative to be executed by a processing element to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed.

This disclosure described some examples of the present technology with reference to the accompanying drawings, in which only some of the possible examples were shown. Other aspects can, however, be embodied in many different forms and should not be construed as limited to the examples set forth herein. Rather, these examples were provided so that this disclosure was thorough and complete and fully conveyed the scope of the possible examples to those skilled in the art.

Although specific examples were described herein, the scope of the technology is not limited to those specific examples. One skilled in the art will recognize other examples or improvements that are within the scope of the present technology. Therefore, the specific structure, acts, or media are disclosed only as illustrative examples. Examples according to the technology may also combine elements or components of those that are disclosed in general but not expressly exemplified in combination, unless otherwise stated herein. The scope of the technology is defined by the following claims and any equivalents therein.

What is claimed is:

1. A method for detecting a signal measurement error in one or more samples, the method comprising:

providing a well plate comprising a plurality of wells, the plurality of wells including error correction wells and sample wells, each sample well including a single sample, and each error correction well including a mixture of samples identical to the single samples in two or more of the sample wells;

receiving at least one aliquot from each of the plurality of wells at a sample receiver;

measuring a signal for the received at least one aliquot;

calculating an expected signal for each of the error correction wells;

comparing the measured signal to the calculated expected signal for each error correction well;

determining, based on the comparison, whether an error exists in the signal of at least one of the sample wells; and when the error exists, correlating the error to one or more of the sample wells.

2. The method of claim 1, wherein measuring the signal comprises measuring at least one of a height of a peak of the signal, an area under the peak of the signal, and a full-width-half maximum of the peak of the signal.

3. The method of claim 1, wherein calculating the expected signal for each error correction well is performed based on the measured signals from each sample well containing samples present in the error correction well.

4. The method of claim 1, wherein calculating the expected signal for each correction well comprises performing a sum of the signals measured for each sample well containing a sample present in the error correction well.

5. The method of claim 1, further comprising introducing a plurality of aliquots from the well plate into the sample receiver, and wherein a rate of introducing the aliquots into the sample receiver is higher than a base-line full width of the measured signal.

6. The method of claim 1, wherein correlating the error to the one or more sample wells comprises identifying one or more sample wells for which the signal is m error.

7. The method of claim 1, further comprising correcting the error in the one or more sample wells, and wherein correcting the error comprises at least one of:

measuring another signal from the one or more sample wells at a slower rate;

changing parameters in a deconvolution of the measured signal; and changing measurement settings.

8. The method of claim 1, further comprising inputting one of the measured signal or the corrected signal for one of the sample wells in a deconvolution algorithm of the measured signal.

9. The method of claim 1, wherein calculating the expected signal for each correction well comprises performing a sum of previously known signals for the sample wells for each sample present in the error correction well.

10. A mass analyzer comprising: a sample receiver;

a mass analysis device fluidically coupled to the sample receiver;

a processor operatively coupled to the sample receiver and to the mass analysis device; and a memory coupled to the processor, the memory storing instructions that, when executed by the processor, perform a set of operations comprising:

providing a well plate comprising a plurality of wells, the plurality of wells including error correction wells and sample wells, each sample well including a single sample, and each error correction well including a mixture of samples identical to the single samples in two or more of the sample wells;

receiving, at the sample receiver, at least one aliquot from each of the plurality of wells;

measuring a signal for the received at least one aliquot with the mass analysis device;

calculating, via the processor, an expected signal for each of the error correction wells;

comparing, via the processor, the measured signal to the calculated expected signal for each error correction well;

determining, via the processor, whether an error exists in the signal of at least one of the sample wells based on the comparison; and when the error exists, correlating, via the processor, the error to one or more sample wells.

11. The mass analyzer of claim 10, further comprising a non-contact sample ejector;

wherein receiving the at least one aliquot comprises introducing, with the non-contact sample ejector, the at least one aliquot from the well plate into the sample receiver.

12. The mass analyzer of claim 11, wherein the non-contact sample ejector comprises an acoustic droplet ejector.

13. The mass analyzer of claim 11, wherein a rate of the aliquot ejections by the non-contact sample ejector is higher than a base-line full width of the measured signal.

14. The mass analyzer of claim 10, wherein the mass analysis device comprises at least one of a differential mobility spectrometer (DMS), a mass spectrometer (MS), and a DMS/MS.

15. The mass analyzer of claim 10, wherein the sample receiver comprises an open port interface.

16. The mass analyzer of claim 10, wherein:

the well plate includes sixteen wells arranged in a 4×4 array;

wherein eleven wells of the sixteen wells are sample wells; and wherein five wells of the sixteen wells are error correction wells.

17. A sample detection system comprising:

a sample receiver;

a detection device operatively coupled to the sample receiver;

a processor operatively coupled to the sample receiver and to the detection device; and a memory coupled to the processor, the memory storing instructions that, when executed by the processor, perform a set of operations comprising:

providing a repository comprising a plurality of sample repositories, the plurality of sample repositories including error correction repositories and individual sample repositories, each sample repository including a single sample, and each error correction repository including a mixture of samples identical to the single samples in two or more of the individual sample repositories;

receiving, at the sample receiver, at least one aliquot from each sample repository;

measuring a signal for the received at least one aliquot with the detection device;

calculating, via the processor, an expected signal for each of the error correction repositories;

comparing, via the processor, the measured signal to the calculated expected signal for each error correction repository;

determining, via the processor, whether an error exists in the signal of at least one of the individual sample repositories based on the comparison; and when the error exists, correlating, via the processor, the error to one or more individual sample repositories.

18. The detection system of claim 17, wherein the detection device is a light detection device or a radiation device.

19. The detection system of claim 17, wherein the measured signal is a light intensity.

20. The detection system of claim 19, wherein the measured light intensity comprises a UV light intensity.

* * * * *